Dec. 1, 1925.                                              1,563,761
                    H. B. LOWDEN
              MEANS FOR CONVERTING MOTION
                  Filed Feb. 29, 1924
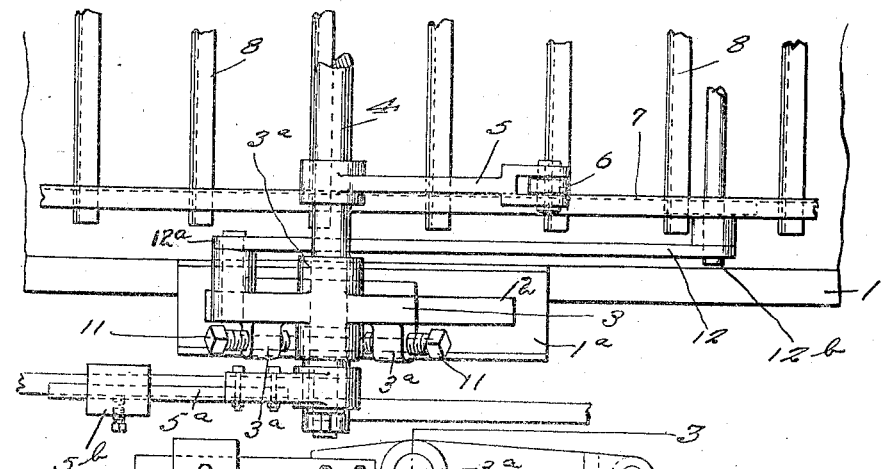
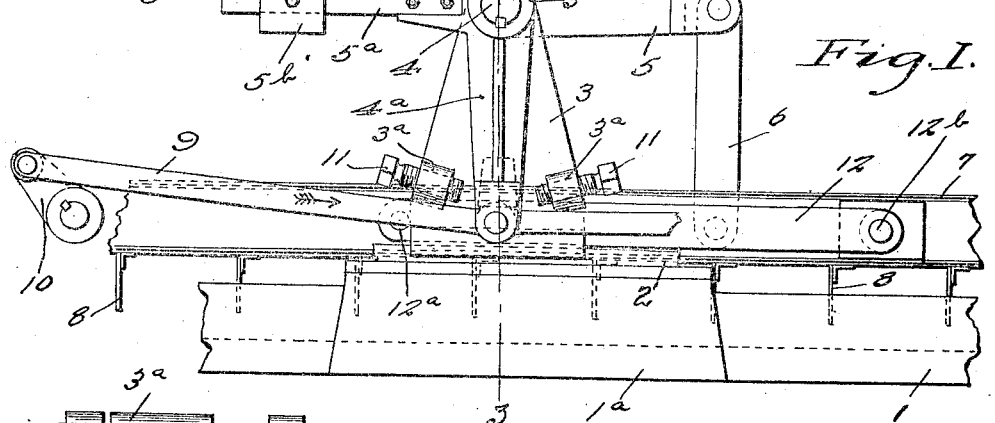
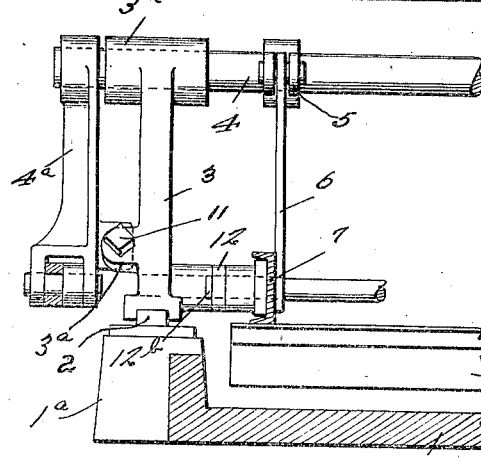
Inventor
Hugh B. Lowden Patented Dec. 1, 1925.

1,563,761

UNITED STATES PATENT OFFICE.

HUGH B. LOWDEN, OF DENVER, COLORADO.

MEANS FOR CONVERTING MOTION.

Application filed February 29, 1924. Serial No. 695,949.

*To all whom it may concern:*

Be it known that I, HUGH B. LOWDEN, a citizen of the United States, and a resident of Denver, in the county of Denver and State of Colorado, have invented certain new and useful Improvements in Means for Converting Motion, of which the following is a specification.

My present invention relates to an improved means for imparting to an element a movement in a substantially rectangular closed path and constitutes an improvement upon the mechanism disclosed in Letters Patent No. 1,098,812 dated June 2, 1914.

The invention aims to provide a construction which will relieve the rock shaft of bending strains and avoid any tendency of the slide blocks to tilt when heavy work or resistance is encountered, and the invention includes the novel features of construction and arrangement and combination of parts hereinafter described and particularly defined by the appended claims.

In order that my invention may be more readily understood, I have appended hereto explanatory drawings in which I have shown the improvements arranged for actuating a rake cooperating with a conveyor trough.

In these drawings, Figure 1 is a side elevation.

Fig. 2 is a plan view, and

Fig. 3 is a section on line 3—3 Fig. 1.

In these drawings I have, for convenience of illustration, shown only a portion of one side of the conveyor, it being understood that the other side of the conveyor would be provided with a duplicate of the mechanism shown, and further that the end of the conveyor rake which is omitted from the drawings would be similarly supported.

Referring by reference characters to these drawings the numeral 1 designates a conveyor trough which is intended to be representative of any surface over which material is adapted to be conveyed.

Upon the side support $1^a$ of this trough is mounted a slide way 2 upon which is slidably guided a member or block 3, at the upper end of which is journaled in a suitable bearing $3^a$, a rock shaft 4. 5 designates a substantially horizontally projecting arm fast on the rock shaft and having its free end connected by a depending link 6 to the rake bar 7, the rake blades being indicated at 8.

Means for counterbalancing the weight of the rake may be provided in the shape of arm $5^a$ and counterweight $5^b$.

Shaft 4 is provided with a depending arm $4^a$ fast thereon which is connected at its lower end by a pitman 9 with a prime mover, shown for convenience merely as a crank 10. Stops are provided for limiting the swinging movement of the arm $4^a$ and these may take the form of set screws 11 threaded through lugs $3^a$ on the slide blocks or members 3. The link (or links) 6 constitute means for flexibly supporting the rake, serving only to support it and impart the vertical components of the compound movement. For imparting the horizontal movements I provide a link 12 having its ends pivotally connected respectively to the blocks at $12^a$ and to the rake frame at $12^b$, this link constituting a push and pull connection which is flexible vertically whereby the rising and falling of the rake frame is accommodated.

From the foregoing it is believed the manner of operation of my improved mechanism will be obvious, but it may be briefly stated as follows:

Assuming that the pitman is moving in the direction of the arrow Fig. 2, bell crank arm $4^a$ would be moving to the right, and this movement through arm 5 and link 6 would raise the rake vertically, which movement would be permitted by the flexible connection (link) 12. Movement of arm $4^a$ to the right would continue until it came in contact with the right hand stop 11 whereupon the slide block would be moved to the right until the pitman had reached the limit of its stroke.

Movement of the slide block is imparted directly to the rake frame, however, by the link 12 and as this is operating substantially in line with the pitman the thrust is direct and there is no tendency to tilt the slide block, and furthermore the rock shaft is relieved of all thrusting strains.

In the movement of the pitman to the left the reverse operation takes place, as will be readily understood.

Having thus described my invention what I claim is:

1. Mechanism for imparting motion to an element in a substantially rectangular closed path comprising a slider, a bell crank pivotally supported thereby having substantially horizontal and vertical arms, means for limiting the oscillation of the bell crank, push and pull means connected to the vertical arm of the bell crank, flexible means connecting said element to the horizontal arm of the bell crank, and connecting means apart from said horizontal arm preventing horizontal and permitting vertical movement of said element relative to said slider.

2. Mechanism for imparting motion to an element in a substantially rectangular closed path comprising a slider, a bell crank pivotally supported thereby having substantially horizontal and vertical arms, means for limiting the oscillation of the bell crank, push and pull means connected to the vertical arm of the bell crank, flexible means connecting said element to the horizontal arm of the bell crank, and a link connecting said element with said slider.

In testimony whereof I affix my signature.

HUGH B. LOWDEN.